Sept. 30, 1969    J. L. BRITTAN    3,470,368
GRADEMATIC COMPUTER FOR AVERAGING A PLURALITY OF GRADES
Filed Oct. 21, 1966    2 Sheets-Sheet 1

INVENTOR.
JOHN L. BRITTAN
BY *Price & Heneveld*

ATTORNEYS

United States Patent Office 3,470,368
Patented Sept. 30, 1969

3,470,368
GRADEMATIC COMPUTER FOR AVERAGING A PLURALITY OF GRADES
John L. Brittan, 917 Brunn, St. Joseph, Mich. 49085
Filed Oct. 21, 1966, Ser. No. 588,514
Int. Cl. G06g 7/00
U.S. Cl. 235—193
10 Claims

ABSTRACT OF THE DISCLOSURE

An averaging device particularly adapted for utilization by teachers in averaging a plurality of grades. The device, basically, is electrical, discrete charge quantities being generated which are indicative of each of the possible grades in the particular grading system being utilized. The teacher, through a series of switches on a control panel, causes those of these discrete charges indicative of the particular grades being averaged to be gated into a storage capacitor. A potentiometer network is provided for reducing the charge on the storage capacitor by a factor equal to the number of grades to be averaged. The total charge on the storage capacitor is then converted to a visual average indication by means of a voltmeter.

---

This invention relates to grade averaging devices and, more particularly, to such devices particularly adaptable for use by teachers in averaging a number of scholastic grades to determine the final grade to which the student is entitled for the course.

It is customary for the teachers in educational facilities to give a number of quizzes, exams or the like during the course of a particular grading period. The mark received by each student on each of the exams is usually recorded in a grade book or the like and, at the end of the particular grading period, the recorded marks are averaged to determine the particular student's grade for the course.

If a large number of entries have been made in the grading book for the particular student during the term in question, the final averaging process is both tedious and subject to error. This is particularly true in cases where the grading system is not numerically calibrated but, rather, calibrated in terms of letters or the like. Where a number type system is utilized, it is necessary for the teacher to add all of the individual numbers and then divide by the total. Where a letter type of system is utilized, it is necessary for the teacher to first convert the letter grades to numerical figures, add each of the figures so derived and divide by the total number of grades. The numerical answer must then be reconverted to a letter grade. Not only does this process represent a tedious task for the particular teacher but, additionally, it occupies time which might be better spent, concededly, in the actual teaching process.

It is true that certain mechanical devices such as calculators, adding machines and the like are available to assist the teacher in the grade-averaging process. These devices, however, do not completely fulfill the need for a number of reasons. First of all, if a letter system is being utilized it is still necessary to convert the letters to numerical values prior to introducing them into the calculator or adding machine. Second, the time period occupied by this conversion, and the over-all time period occupied in operating the sometimes complicated equipment with which the teacher is unfamiliar, nearly always renders the demand for such machines at the end of the particular grading period far in excess of the number of machines available at the particular facility. Thus, the vast majority of teachers are still restricted to the use of mental mathematical calculations to determine the grades for their particular pupils at the end of each grading period. Finally, of course, the initial investment and upkeep required for such equipment usually precludes the possibility of having devices available in sufficient quantity for periodic use only and, therefore, most institutions are somewhat reluctant to allow their usage by the relatively unskilled teacher.

It is an object of this invention to provide a grade averaging device for utilization by teachers, professors and the like which will markedly decrease that portion of their time which is currently utilized in averaging grades at the end of each term period and, thus, allow more time to be devoted toward more fruitful academic pursuits.

It is an object of this invention to provide a device of the type described which is capable of accurate and rapid operation by those relatively unskilled and unfamiliar with its use.

It is an object of this invention to provide a grade averager which eliminates the necessity of converting letter grades to numerical values prior to mathematically computing an average thereof.

It is an object of this invention to provide a device of the type described which may be manufactured and sold relatively inexpensively and, thus, which is within the price range of the vast majority of educational facilities.

It is an object of this invention to provide a device of the type described which can be compactly assembled within a relatively small cabinet of relatively light weight and, thus, be capable of being moved from location to location with ease.

It is an object of this invention to provide a device of the type described wherein unavoidable wear on components which might otherwise render the apparatus no longer usable can be easily compensated for by a series of simple adjustments.

It is yet another object of this invention to provide a device of the type described embodying relatively inexpensive electronic components capable of being accurately aligned by the execution of a relatively simple process.

These, as well as other objects of this invention, will be readily understood by those skilled in the art with reference to the following specification and accompanying figures in which.

Briefly, the preferred embodiment of the scholastic averaging device has means for generating electrical signals indicative of each of the grades in a particular grading system and a plurality of switching means labeled with those particular grades adapted to gate the associated electrical signal of the generating means when activated. The electrical signals are received and stored by a suitable receiving section and electrically divided by the total number of grades which are to be averaged. Indicating means calibrated according to the particular grading system being utilized are provided for indicating the desired average after all of the signals indicative of the particular series of grades have been processed.

Figure 1:
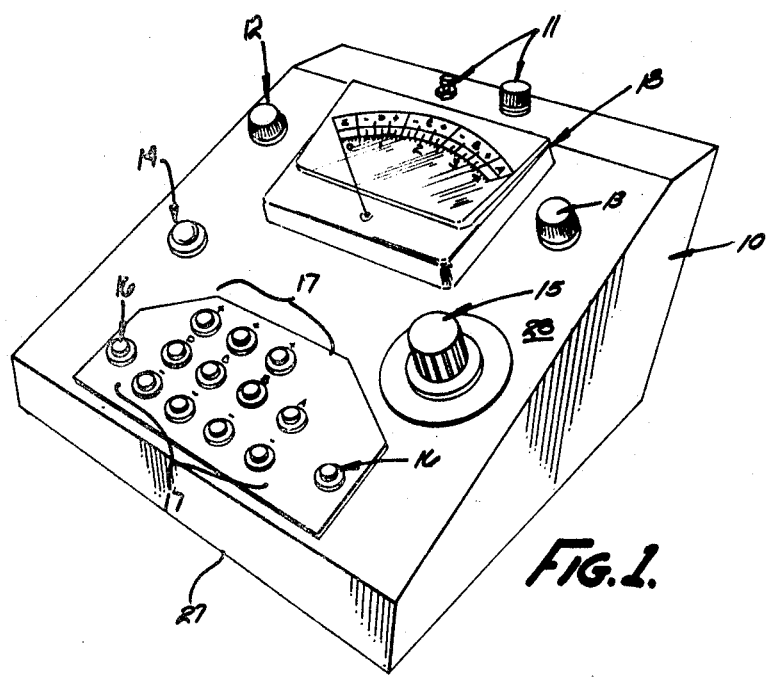
FIG. 1 is a perspective view of the cabinet which houses the grade averaging apparatus.

Referring now to the figures, a preferred embodiment of this invention will be described in detail. FIG. 1 shows the cabinet 10 which houses the working components of the invention. The housing has a bottom 27 adapted to rest on a planar surface such as a table and a sloped control surface 28 adapted to give the operator full view of the controls and indicator meter from a sitting position. The exposed controls on the face of the cabinet comprise a line voltage adjustment 11, a zero adjustment 12, an on-off, B+ adjustment 13, a power indicator lamp or pilot light 14, a number-to-be-averaged control 15 reset controls 16, grade input switches 17 and an indicating meter 18. The function of the various controls will become apparent hereinafter in connection with the description of the electrical circuitry.

Figure 2:
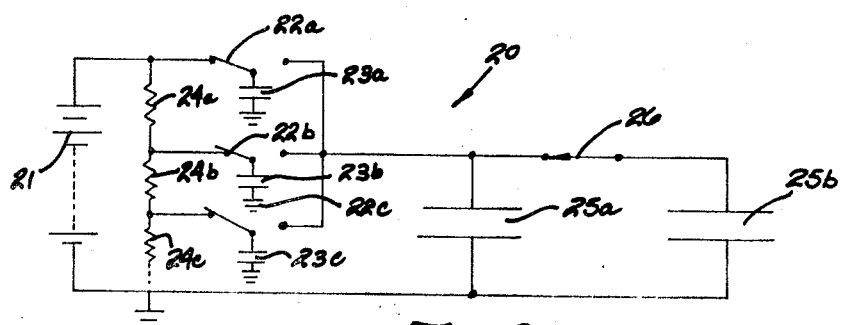
FIG. 2 is a schematic diagram of an illustrative electrical circuit which, although not identically included within the preferred embodiment of this invention, illustrates the mode of function thereof.

FIG. 2 has been included as merely illustrative of the electronic concepts embodied in this invention. There is shown a relatively high voltage DC source 21 which is connected in series with a voltage divider network 24a, 24b and 24c. A plurality of two-position switches 22a, 22b and 22c are associated with a series of capacitors 23a, 23b and 23c respectively. The switches 22, when in the position shown in FIG. 2, cause the capacitors 23 to be charged. When the switches 22 are thrown, the charge on the capacitor tends to transfer into capacitors 25a and 25b, assuming switch 26 is closed.

Assume that switch 26 is open and that capacitors 23 are relatively small in comparison with capacitor 25. For example, capacitor 25 might be 1,000 times as big as the individual capacitors 23. With the switches in the position shown in FIG. 2, each of the capacitors 23 is charged by the high voltage source 21 to a charge Q which charge, of course, will vary on the different capacitors 23 because of voltage divider network 24. When a particular switch 22 is thrown to the position opposite from that shown, the charge on its associated capacitor will be "dumped" into the capacitor 25a. The relative sizes of the capacitors 23 and 25 insure that virtually all of the charge contained on any one of the capacitors 23 will be transferred during this process. Therefore, the quantities of electrical charge placed on each of the capacitors 23 are measured by the voltage divider network 24 can be proportionally stored on capacitor 25 up to several percent of its charging cycle. By the addition of other capacitors 23 in like fashion, other magnitudes of charge can be summed on capacitor 25a.

If a capacitor with a charge Q is connected to an uncharged capacitor of equal capacity, the charge Q will divide itself equally between the two capacitors. Thereafter, the voltage on the original capacitor is one-half the original value since the voltage is proportional to the charge. If the two capacitors are connected in parallel, as is the case with capacitors 25a and 25b after switch 26 has been closed, the measured charges from the capacitors 23 will divide equally over the capacitors 25a and 25b and the resulting voltage on these capacitors will be one-half the value of the charge which would have been on a single summing capacitor 25. Similarly, if three such capacitors 25 are connected in parallel the charges from the capacitors 23 would divide equally and the voltage on any one of the capacitors would be one-third the value of the voltage which would have been placed on a single summing capacitor.

In reality, the number of capacitors 25 serves as a divisor while the total quantity of charge dumped into the capacitors 25a from the capacitors 23 acts as the dividend. The quotient, of course, appears as the voltage across the individual capacitors 25. It will be readily apparent that if voltage divider network 24 is designed such that each of the capacitors 23 is charged to a particular value indicative of a particular grade, that if these values are sequentially dumped into the summing circuit comprising the capacitors 25; and, that if a total number of capacitors 25 are provided which is equal to the total number of grades to be averaged, the average grade will be represented by the voltage across one of the summing capacitors 25.

FIG. 2 has been included in the specification as merely illustrative of the general principles which are employed. In the preferred embodiment of the invention which is to be discussed hereinafter the summing and dividing network represented by the capacitors 25 in FIG. 2, is replaced by fixed and variable resistance elements connected in a series parallel arrangement with a singe storage capacitor. The resistance element is adjusted to correspond to the total number of grades to be averaged and that portion of the voltage is dissipated within the resistance during the summing process. In this particular case, of course, it is necessary to isolate the capacitor by means of a diode to prevent discharge through the variable resistance circuit.

Figure 4:
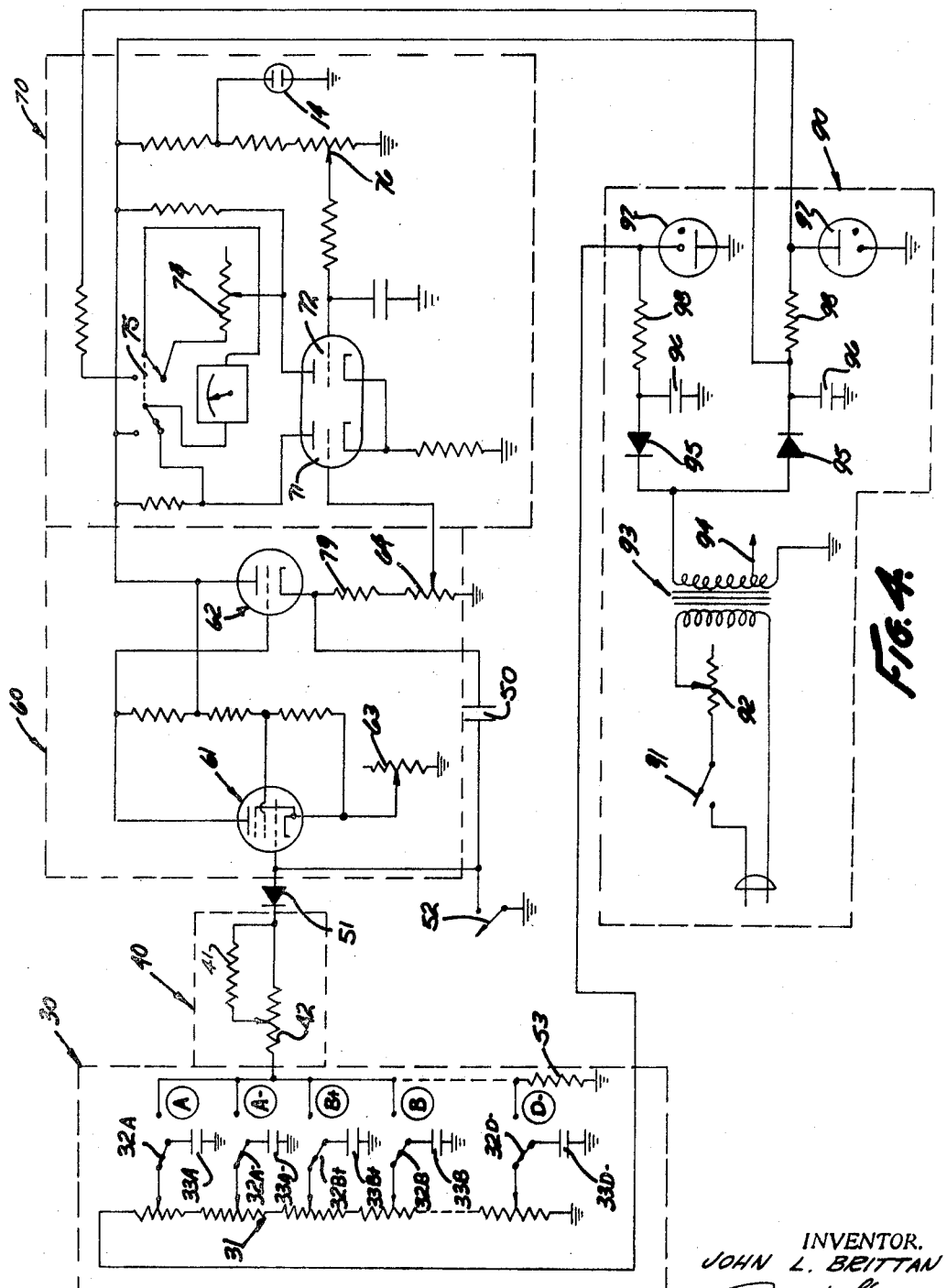
FIG. 4 is a schematic diagram of the electronic circuitry which is housed within the cabinet shown in FIG. 1.

Referring now to FIG. 4, the preferred embodiment of the invention comprises a generating circuit 30 having a voltage divider network 31. A plurality of adjustable tabs on divider network 31 feed, via switches 32, to capacitors 33. The voltage divider network 31 is adjusted such that when switches 32 are in the position shown in FIG. 4, the capacitor 33a is charged by a voltage such that it assumes a charge Q which is equal to an arbitrary A value. The remainder of taps on the voltage divider network are adjusted such that their associated capacitors receive a proportional charge indicative of the particular grade which they represent. Assume, as is indicated in the figure, that the particular grading system contains the grades A, A—, B+, B, B—, C+, C, C—, D+, D, D— and E. In this particular case, assuming the capacitors 33 to be of equal value, the various taps on voltage divider 31 would be set such that the voltage on capacitor 33A caused it to accept a charge which was 11 times as great as the charge accepted by the capacitor 33D—. Similarly, the capacitor associated with the grade C (not shown) would accept a charge which was five times that accepted during the charging process by the capacitor 33D—. It is not necessary, of course, to provide a capacitor for the E grade since it may be represented within the circuit by a zero charge.

The charges are dumped from the capacitors 33 selectively by manipulation of switches 17 on the face of cabinet 10 which manipulation, in turn, causes the throwing of the associated switch 32 into the dividing circuit indicated generally by the reference numeral 40. The dividing circuit 40 consists of a parallel arrangement of a fixed resistor 41 which limits the peak current through diode 51 and a variable resistor 42 which is adjusted by turning the number-to-be-averaged control 15 on the face of cabinet 10. Divider network 40, so adjusted, serves to dissipate the necessary proportion of the charge which is dumped thereinto by the actuation of switches 32. For example, if 12 grades were to be averaged, the divider network would be set to dissipate a sufficient amount of voltage to cause the output voltage of the divider circuit to be one-twelfth of the input voltage. This analysis assumes, of course, that other circuit parameters do not affect the voltage or charge quantity thereafter.

After the voltage on the charge has been reduced by the proper amount within network 40, the charge is dumped into capacitor 50. An isolation diode 51 prevents discharge of capacitor 50 through resistor 53. Resistor 53 negates any tendency for leakage from switches 32, particularly in the event that the voltage divider network 40 is set at a low value. Diode 51 keeps one end of capacitor 50 at a high impedance level to insure that the summed and divided charges placed thereon will be maintained.

The input circuit 60 comprises two tubes 61 and 62 which are connected such that the input to tube 61 (from capacitor 50) has an infinite impedance to prevent undesirable discharge of capacitor 50 resulting in error or drifting of the readout device to be discussed hereinafter. The high impedance end of capacitor 50 is connected to the control grid of tube 61 in floating grid fashion. There is no usual grid resistor and diode 51 and capacitor 50 offer no grid leak action. Cathode bias resistor 63 is adjusted such that tube 61 is near cutoff. The control grid of tube 61 is, thus, negative and draws no grid current. Therefore, the control grid of tube 61 is actually looking into infinite DC impedance, there is no way for capacitor 50 to discharge and, thus, the readout meter to be discussed hereinafter will accurately follow proportional charges established on capacitor 50.

The connection of the low impedance plate of capacitor 50 to the cathode of tube 62 causes charge to be removed from the capacitor 50 as the apparatus is operated. This removal is caused by the amplification properties of the input circuit 60. The effect of this amplification is to increase the capacity of capacitor 50 by the amplification factor of the tube 61-tube 62 circuit and, as a result, capacitor 50 may be much smaller in unit measure of capacity than would otherwise be the case. This, of course, reduces the expense involved in the fabrication of the apparatus.

Switch 52 is provided for resetting the capacitor 50 for the next averaging event. By closing this switch, all of the charge on the capacitor is diverted to ground. After the switch 52 has been reopened, a new averaging event may be initiated. Switch 52 is controlled by the activation of buttons 16 on the control panel shown in FIG. 1. Two such buttons are provided at either side of the operating panel to permit usage with maximum efficiency by either a left-handed or right-handed person.

The readout section of the apparatus 70 comprises a relatively conventional vacuum tube volt meter having a pair of vacuum tubes 71 and 72 which may be enclosed, conveniently, within the same envelope. The input signal is taken from variable resistor 64 and, of course, is indicative of the momentary charge on capacitor 50. Switch 75 permits the meter to be thrown into the DC power supply circuit to adjust the power supply voltage within proper boundaries. Variable resistor 74 serves as a fine adjustment for the dividing process. Finally, a third variable resistor 76 is provided within this circuit to permit zero adjustment of the meter. Potentiometer 76 is controlled, of course, by knob 12 on the cabinet.

The power supply is of conventional type comprising an off-on switch 91 controlled by knob 13, a voltage controlling variable resistor 92 controlled by knob 11 on the cabinet, a transformer 93 having a filament tap 94 and a pair of rectifying diodes 95. The negative and positive voltages are regulated by a pair of VR tubes 97. Additional regulation is gained from the neon power indicator 14 for the zero adjustment control. Filtering of the positive and negative signals is achieved by the capacitors 96 and resistors 98. The line voltage adjustment resistor 92 serves to maintain the filament voltage 94 within predetermined limits as a means of insuring that changes in filament voltage will not change the cutoff point of tube 61.

Figure 3:
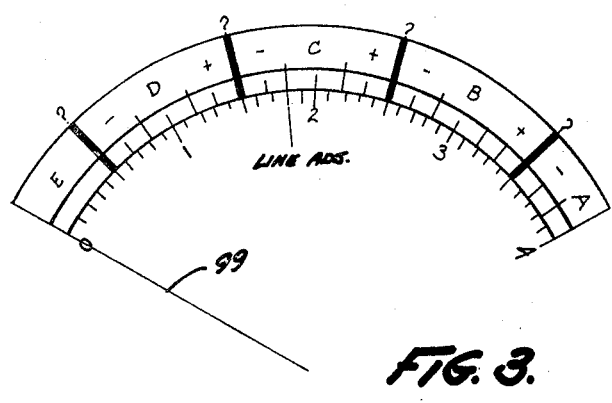
FIG. 3 is a front-elevational view of the meter scale and pointer arrangement.

Referring to FIG. 3, the meter scale is calibrated in terms of the particular grade system with respect to which the averaging process is conducted. While an A, B, C, D, and E scale is illustrated on the schematic diagrams shown in FIG. 4, it will be readily understood that a so-called four point system or any other type of grading system could be utilized by changing the positions of the slides on voltage divider network 31 and changing the nomenclature on the buttons 17 of the control panel. The latter operation, of course, is not necessary when converting from the letter system to the four point system so long as only a one, two, three or four input is utilized. In this particular case, the numbers correspond directly to the grades D, C, B and A respectively and the apparatus may be utilized for either system.

OPERATION

The knob 13 is rotated to close switch 91 and, thus, supply power to the circuit. The power line voltage is adjusted by depressing button 11 which toggles gang switch 75 and rotating the associated knob 11 which adjusts rheostat 92 until such time as the indicator shown in FIG. 3 corresponds to the line adjustment mark. This process merely assures that the system will operate under a constant line voltage regardless of local variations above that point. With one of the reset buttons 16 depressed so as to close switch 52, the variable resistor 63 is adjusted until the meter indicator remains stationary in the D or E area each time the reset button is activated to close switch 52. This procedure, of course, adjusts the cathode potential on tube 61 to the desired cutoff point.

Next the zero adjustment control 12 is rotated to change the resistance of resistor 76 until the pointer 99 indicates the grade points (E) or, in other words, it has moved to the position shown in FIG. 3. The number-to-be-averaged control 15 is then set to its mid point and the B adjust control 13 is rotated to its extreme clockwise position. Any combination of keyboard buttons are momentarily depressed until the meter needle 99 indicates exactly four grade points (A). At this point the B adjust control knob 13 is moved to its extreme counterclockwise position, the number of grade point divisions the pointer fallen noted, and the B control 13 readjusted until the pointer indicates a drop of approximately one-half the number of grade point division. For example, assume that when B adjust control is rotated full counterclockwise, the pointer moves from 4 backward through nine small grade point divisions. The B adjust control is then rotated clockwise until the pointer moves upscale four and one-half small divisions.

Assuming now that the computer is fabricated so as to be capable of averaging 30 grades, and that the number-to-be-averaged knob is on 15, the A button on the keyboard is pressed 15 times. Rheostat 64 is then adjusted until the pointer indicates four grade points. At this point the zero adjustment is again adjusted so that the pointer indicates zero grade points. These steps are repeated until such time as the pointer always indicates zero when the reset button is pushed and a 4 is registered when the A button has been pressed 15 times. If necessary, a similar alignment procedure may be conducted with the number-to-be-averaged control set at approximately four and, of course, the A button depressed four times.

At this point, the A— through D— buttons on the keyboard are calibrated by adjusting the positions of the slides on the voltage divider 31. This is accomplished, for example, by setting the number-to-be-averaged control to four; depressing the A— button four times; and, adjusting the associated slide if the pointer does not register A—. This process is repeated for all of the grade buttons.

The alignment procedures which have been outlined previously are not conducted by the teacher, but, rather, at the factory or by other skilled technicians. The adjustments for the voltage divider network and the resistors 63 and 64 may be enclosed, therefore, within the cabinet 10 and, thus, accessible only by removing the back thereof.

Assuming that the set has been properly aligned and placed in a learning faciilty, a teacher may quickly prepare it for operation in the following manner. After the switch 13 has been turned to its on position and the set given approximately one minute to warm up, the reset button is depressed to dump any charge which may remain on capacitor 50 and the line adjustment controls 11 manipulated to bring the pointer 99 to the line adjustment mark on the meter. The number-to-be-averaged control 15 is set to the number of grades which are to be averaged and, again, the reset button depressed. The meter pointer 99 is then adjusted to zero using the zero-control adjustment and a B grade is inserted into the apparatus the same number of times that the number-to-be-averaged control has been set for. At this point, the B adjust control knob 13 is moved until the meter indicates a B. The latter steps are repeated until relatively steady-state conditions are reached. At this point, the device is ready to average the teacher's letter grades.

Assume that during the particular grading term two quizzes, one test and one exam have been given to each student and that the teacher wishes to count the test twice as much as the quizzes and the exam three times as much as the quizzes. Assume further that the previously outlined alignment process to be executed by the teacher has been conducted with the number-to-be-averaged control set at seven. If a particular student received a C and a B+ on the two quizzes, a D on the test and an A— on the exam, the teacher will depress the C button once (quiz), the B+ button once (quiz), the D button twice (test) and the A— button three times (exam). This, of course, gives a total of seven inputs into the apparatus. As each of the buttons are depressed, the associated quantity of charge is dumped into capacitor 50 via divided network 41. The releases of the buttons causes them to be reconnected to the voltage divider network and, thus, quickly recharged.

When the charge on any one of the capacitors 33 is transferred by this switching process to the voltage divider network 40, it is conducted through diode 51 to the control grid of tube 61. Since tube 61 is near cutoff condition due to the low screen voltage and high cathode bias, its plate voltage is low. As the control grid receives the negative charge through diode 51, the plate current drops causing a consequent rise in plate voltage. The plate of tube 61 is connected to the cathode follower 62 control grid and, thus, a rise in tube 61 plate voltage causes a rise in the cathode voltage across resistor 79 of tube circuit 62. Negative feedback from the cathode of tube 62 through capacitor 50 and the floating control grid of tube 61 hold the grid at a steady negative condition. As other negative charges from capacitors 33 reach the control grid of tube 61, the plate voltage thereof continues to rise proportionally to the charge and each time the feedback capacitor 50 holds the grid at its new negative potential. By increasing the resistance of circuit 40, the effect of negative charges from the 33 capacitors is reduced and, thus, a proportional dividing accomplished.

When the teacher has completed the sequence of seven inputs outlined above, the meter pointer 99 will point to the average grade. In this particular case, the pointer will point towards the B— section of the scale. After this reading has been recorded, one of the reset buttons is depressed and the process repeated for the next student. No further alignment is necessary until such time as the number-to-be-averaged is changed. If such occurs, the teacher must repeat the aligning steps as outlined above.

From an electronic standpoint, the relative accuracy with which the preferred embodiment of the circuit will function is a product of (1) the manner in which the storage capacitor 50 is incorporated into the circuit and (2) the provision of numerous adjustments whereby low cost components of varying accuracies may be utilized and, thereafter, adjusted so as to function correctly. As pointed out previously, the grid of tube 61 is actually looking into infinite DC impedance. Under starved conditions, the tube 61 plate current gives no electrons to its control grid and, thus, the grid potential stays where it is put as long as it is kept negative with respect to its cathode. Thus, capacitor 50 is capable of accurately maintaining a charge for a sufficient period of time to allow completion of the particular averaging sequence.

While a preferred embodiment of this invention has been described in detail, it will be readily apparent to those skilled in the art that other embodiments may be conceived and fabricated without departing from the spirit of this specification and the accompanying drawings.

I claim:

1. A scholastic averaging device for use by teachers for averaging a predetermined number of grades, said device comprising:
   means for generating electrical signals indicative of each of the grades in the particular grading system the teacher utilizes;
   a plurality of discrete, manually actuatable switching means, said switching means being labeled with a particular grade and operable, when actuated, to gate the electrical signal indicative of that particular grade out of said generating means;
   means for accumulating the electrical signals which have been gated out of said generating means by the actuation of the grade labeled switching means;
   means for dividing the signals in said accumulating means by the number of grades which are to be averaged; and
   indicating means calibrated according to said particular grading system for indicating the desired average after all of the switch means representing the grades to be averaged have been actuated.

2. The apparatus as set forth in claim 1 in which said generating means generates a particular quantity of charge for each of the grades in the particular system.

3. The apparatus as set forth in claim 1 wherein said dividing means is adjustable to permit the averaging of different numbers of grades.

4. The apparatus as set forth in claim 1 wherein said generating means comprises a plurality of generating capacitors and means for charging said generating capacitors to a level indicative of the particular grade with which the particular capacitor is associated and in which said accumulating means comprises an accumulating capacitor into which said generating capacitors dump their charges when gated by the associated switching means.

5. The apparatus as set forth in claim 4 wherein said dividing means comprises an adjustable impedance element operable to decrease the voltage of the signals gated between said generating capacitors and said accumulating capacitor in proportion to the number of grades to be averaged.

6. The apparatus as set forth in claim 5 wherein the level of charge on said accumulating capacitor is sensed by an amplifying circuit having a predetermined amplification factor and which further comprises means connecting said accumulating capacitor into said circuit such that the ostensible capacity thereof is increased by a factor equal to said amplification factor.

7. The apparatus as set forth in claim 5 wherein the level of charge on said accumulating capacitor is sensed by a vacuum tube having a floating grid, said capacitor being connected to said floating grid.

8. The apparatus as set forth in claim 7 which further comprises means for retaining the potential on said floating grid negative with respect to the cathode of said tube whereby said accumulating capacitor looks into infinite DC impedance within said network.

9. The apparatus as set forth in claim 8 wherein said indicating means comprises a vacuum tube voltmeter, the scale of said voltmeter being calibrated in the particular grades to be averaged.

10. The apparatus as set forth in claim 9 wherein said meter may be switched into the power supply and which further comprises means for adjusting the power supply voltage such that variations in line voltage do not affect the cathode voltage of said tube.

References Cited

UNITED STATES PATENTS

| 2,985,371 | 5/1961 | Canderer et al. | 235—193 X |
| 3,030,569 | 4/1962 | Chilton | 235—193 X |
| 3,342,984 | 9/1967 | Gray et al. | 235—193 X |

MALCOLM A. MORRISON, Primary Examiner

J. F. RUGGIERO, Assistant Examiner

U.S. Cl. X.R.

235—184